A. RECTOR.
HEATING AND VENTILATING APPARATUS.
APPLICATION FILED SEPT. 26, 1910.
1,292,877.
Patented Jan. 28, 1919.
2 SHEETS—SHEET 2.
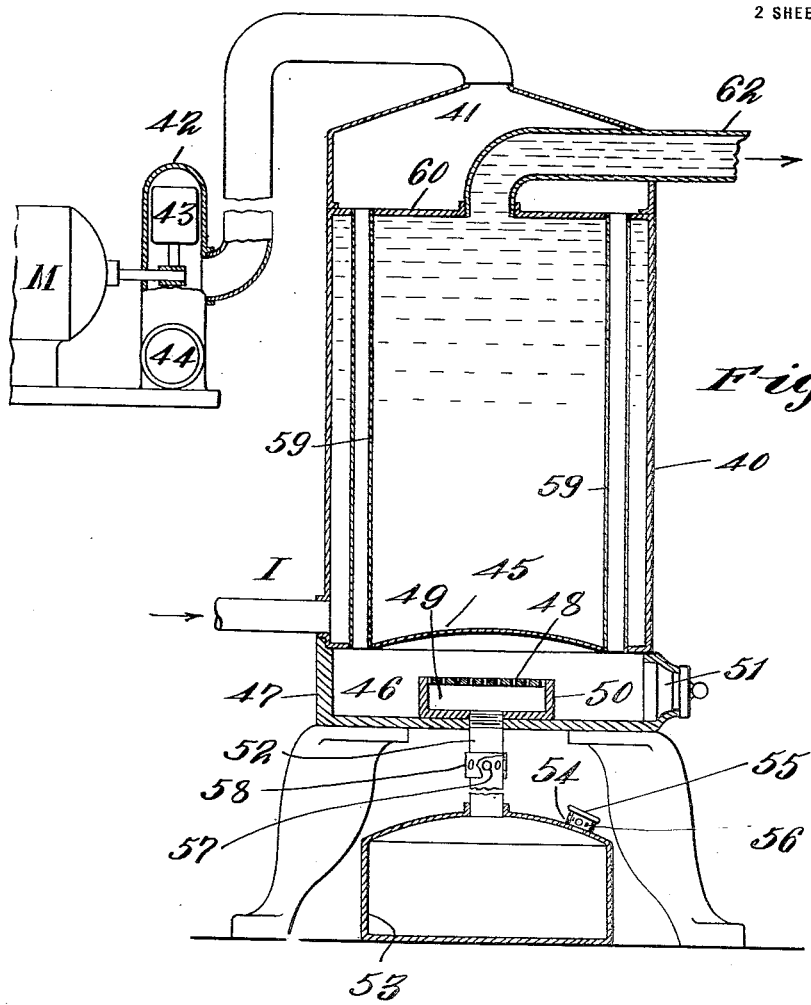
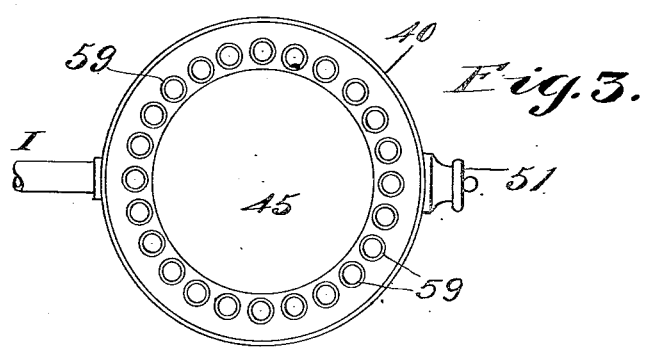

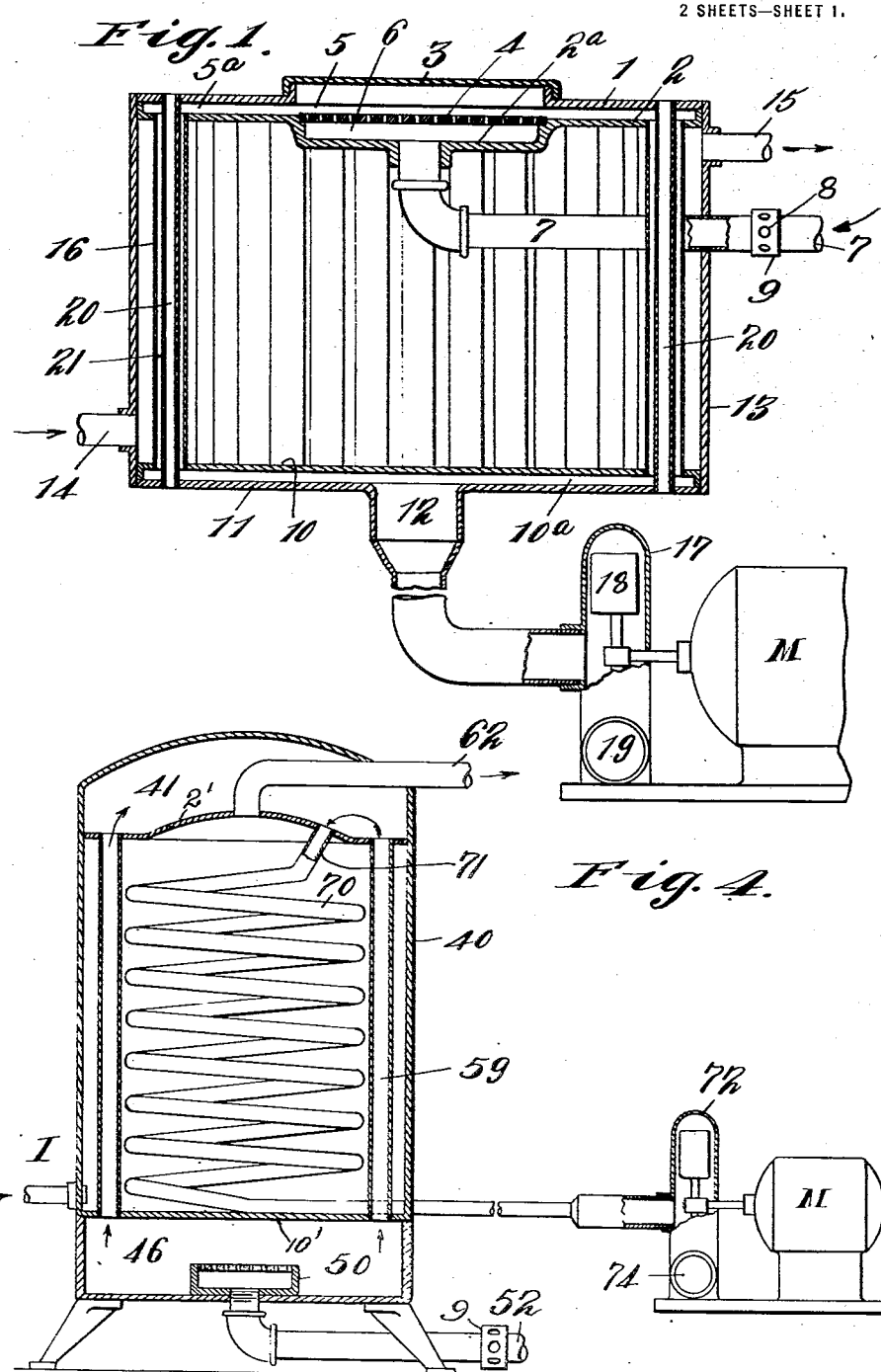

UNITED STATES PATENT OFFICE.

ALCORN RECTOR, OF NEW YORK, N. Y., ASSIGNOR TO RECTOR GAS LAMP COMPANY, OF NEW YORK, N. Y., A CORPORATION OF NEW YORK.

HEATING AND VENTILATING APPARATUS.

1,292,877.          Specification of Letters Patent.          Patented Jan. 28, 1919.

Application filed September 26, 1910. Serial No. 583,784.

*To all whom it may concern:*

Be it known that I, ALCORN RECTOR, citizen of the United States, residing at New York city, in the county and State of New York, temporarily residing in the city of Pittsburgh, in the county of Allegheny and State of Pennsylvania, have invented certain new and useful Improvements in Heating and Ventilating Apparatus, of which the following is a specification, reference being had therein to the accompanying drawings.

An object of this invention is to produce a simple and effective apparatus for use in heating water either to a degree below or above the steam generating point, and for heating air. The apparatus is designed to use gaseous fuel, and a main object of the invention is to utilize a maximum of the heat units in the fuel.

In the accompanying drawings illustrating the principle of this invention and the best mode now known to me of applying that principle, Figures 1 and 2 are sectional elevations of two different forms of apparatus embodying my invention, and Fig. 3 is an under-plan view of the water or air-holding reservoir shown in Fig. 2. Fig. 4 is a sectional elevation of still another form of apparatus embodying my invention, and particularly adapted for water-heating or steam-making.

In the drawings, referring to Fig. 1, 1 and 2 are parallel top plates of the apparatus spaced apart for a purpose to be explained. The outward plate 1 is formed with a hole and cover 3, and the inner plate with a central depression 2ª for reception of the perforated burner-plate 4 in the space between the bottom of depression 2ª and the cover 3, in the present preferred embodiment of the invention, to form a central combustion chamber 5 at the upper side of the burner-plate 4 and a gas-receiving chamber 6 below it. Gas chamber 6 is supplied with any suitable gaseous fuel, such as alcoholic, kerosene or gasolene vapor, artificial or natural gas, either unmixed or mixed by preference with air through a fuel supply pipe 7 which is provided, exteriorly of the apparatus, with a hole 8 for admission of air or other combustion-supporting gas into the pipe, wherein it is mixed with combustible vapor supplied through pipe 7. A perforated adjustable collar 9 is provided at this point to cover or uncover holes 8. Around the combustion chamber, the plates 1 and 2 are preferably brought close together to form a narrow or shallow flue-like space 5ª, so as to compel as much of the products of combustion to come in direct contact with the upper and lower plates 1 and 2 as possible, thereby to radiate as many of the heat units as feasible consistently with a proper rapid withdrawal of the products of combustion from the combustion chamber.

The bottom of the apparatus is made up of two plates 10 and 11 spaced slightly apart to form a passage 10ª for the flow of the products of combustion to the central exhaust port 12 in the outermost plate 11. The reason for spacing these two plates rather a short distance apart is the same as that stated for forming the narrow flue 5ª. The upper pair of plates 1 and 2 form the top or one end wall and the pair of plates 10 and 11 form the bottom or other end wall of the outer casing 13, which with said plates constitute a reservoir for the medium to be heated, this reservoir being provided with an inlet port 14 and an outlet port 15. The flues 5ª and 10ª are connected by (preferably) a plurality of pipes 16; and the exhaust port 12 for passage of the products of combustion is connected with preferably a suitable suction exhaust apparatus consisting of a suction fan casing 17, fan 18 and exhaust port 19. For the best results, the fan should be operated to effect a high speed suction, so as to withdraw the products of combustion rapidly away from the flame and out of the combustion chamber, to prevent back pressure on the flame by the products of combustion and to improve combustion. To increase the radiation within the reservoir of the heat in the products of combustion and to radiate as many of the heat units as possible for heating the contents of the reservoir, each tube 20, the exterior diameter of which is but slightly less than the interior diameter of a tube 16, is passed through each of the latter, the ends of each tube 20 being fixed in the two outermost plates 1 and 11. In this way a plurality of narrow flues 21, each between a tube 16 and a tube 20, are formed between the flues 5ª and 10ª, and as the products of combustion are drawn through the flues 21, a maximum volume of the products of combustion are brought into direct contact with the opposing walls of tubes 16 and 20, and consequently a maximum number of the heat units of the products of combustion are utilized. The hottest portion of the apparatus, in use, will of course be the combustion chamber; but, if necessary or desired, the plate 1, as well as the entire apparatus, may be covered with heat-insulating material (not shown). The tubes 20 are open at each end of the apparatus, which, when used in vertical position, as shown, effects a constant upward ascent of colder air below the apparatus or nearer the floor through tubes 20 to the warmer air above, by natural draft.

The apparatus, in whole and in part, may be made of any desired size, shape and material, or differ greatly in detail without departing from my invention, and any appropriate artificial means for forcibly moving the products of combustion may be substituted for the suction apparatus shown, but it should be such as to produce a rapid and powerful movement as distinguished from a natural draft, for the apparatus shown could not be operated under natural draft conditions.

Referring to Fig. 2, 40 is the exterior casing or reservoir provided at its upper end with a chamber 41 for products of combustion and there connected with the casing 42 of a suction fan 43, the casing having an exhaust port 44. The bottom 45 of the reservoir forms the upper wall of the combustion chamber 46 formed in the base 47. A perforated burner-plate 48 is mounted above a fuel-receiving chamber 49 formed by the plate and walls of a receptacle 50 located or formed within the combustion chamber, which is provided with a door 51 for use in igniting the charge. The gas chamber is connected by a conduit 52 with any suitable source of fuel supply, such, for example, as fuel reservoir 53. In this embodiment, the reservoir is formed with a nipple 54 provided with a screw cap 55 perforated at 56 for admission of air to the fuel reservoir 53, where the air so admitted is initially mixed with the vapor or gas of the reservoir content, which may be gasolene or alcohol, for example. The conduit 52 is perforated at 57 for admission of air or other combustion-supporting gas into the initial gaseous mixture automatically generated in the fuel reservoir. An adjustable perforated collar 58 serves to stop the perforation 57 or to regulate the amount of air taken in thereat.

The combustion chamber is connected with the upper chamber 41 for the escaping products of combustion by a series of pipes 59, the lower ends of which are fixed in the bottom 45 and the upper ends of which are fixed in the transverse plate 60 forming the bottom of chamber 41. An escape pipe 62 for the heated water or steam leads from a port in plate 60 through the chamber 41 and to any desired point outside the apparatus. The products of combustion are drawn through the pipes 59 and lose their heat to the water.

In the forms of apparatus shown the products of combustion are removed from the apparatus after they have lost their heat units, to the matter heated to a greater extent than is possible under natural draft conditions, and this is important The exterior casing may be omitted when the apparatus is to be used merely as a heater of the open air in a room.

In Fig. 4, 40 is the exterior casing, 41 a chamber for products of combustion, 46 a combustion chamber adjacent to the burner 50, 52 the fuel-supply pipe for the burner, and 9 the air-admission regulator for the pipe. The apparatus is provided with pipes 59 connecting the combustion-chamber 46 with the chamber 41 remote from the combustion chamber, 2' is a diaphragm or plate at the bottom of the chamber 41, 10' is a plate at the top of the combustion chamber 46, 70 is a coil for the products of combustion leading from chamber 41 through the flue-chamber, 71 being the intake end of this flue-chamber, and the pipe or coil 70 leading to the suction-rarefaction apparatus 72 the exhaust of which is indicated by 74. A motor M is indicated for driving the exhaust fan. In all forms of the apparatus it will be observed that the combustion chamber adjacent the burner forms one end, and the combustion-products chamber 41 forms the other end of the apparatus, so that the products of combustion are sucked through the entire length of the combustion-chamber and interiorly of matter to be heated.

In all of the figures, I represents an inlet for water or air.

What I claim is:—

1. A heating apparatus comprising a substantially closed combustion chamber; means for supplying to the combustion chamber a mixture of fuel and air, the proportion of air in the mixture being substantially that needed for the combustion of the fuel; an exhaust conduit in communication with said combustion chamber; an inclosure for the chamber and the conduit and a medium to be heated and provided with suitable inlet and outlet ports for the medium; artificial draft means in communication with the conduit through the inclosure operable to suck into the chamber the air required for combustion and to forcibly move the combustion products from the chamber through the conduit interiorly of the medium and thence out of the inclosure.

2. A heating apparatus comprising a substantially closed combustion chamber; means for supplying to the combustion chamber a mixture of fuel and air, the proportion of air in the mixture being substantially that needed for the combustion of fuel; an exhaust conduit communicating with said combustion chamber; an inclosure for the conduit and medium to be heated and provided with suitable inlet and outlet ports for the medium; artificial draft means operable to suck into the chamber the air required for combustion and to forcibly move the combustion products through the conduit and through the inclosure the contents of which are heated by radiation from the conduit.

3. A heating apparatus comprising a substantially closed combustion chamber; means for supplying to the combustion chamber a mixture of fuel and air, the proportion of air in the mixture being substantially that needed for the combustion of fuel; an exhaust conduit communicating with said combustion chamber; an inclosure for the conduit and a medium to be heated and provided with suitable inlet and outlet ports for the medium; artificial draft means communicating with the conduit through the inclosure operable to suck into the chamber the air required for combustion and to suck the combustion products through the conduit and out of the inclosure.

4. A heating apparatus comprising a combustion chamber so restricted in its openings as to be inoperative under a natural draft; means for supplying to the combustion chamber a mixture of fuel and air, the proportion of air in the mixture being substantially that needed for the combustion of the fuel, an exhaust conduit communicating with said combustion chamber; an inclosure for the conduit and a medium to be heated and provided with suitable inlet and outlet ports for the medium; artificial draft means for making the combustion chamber operative by sucking air into the chamber and moving the combustion products out of the chamber through the conduit in heating contiguity to the medium to be heated.

5. A heating apparatus comprising a substantially closed combustion chamber, means for supplying to the combustion chamber a mixture of fuel and air, the proportion of air in the mixture being substantially that needed for the combustion of the fuel, an exhaust conduit communicating with said combustion chamber, an inclosure for the conduit and medium to be heated and provided with suitable inlet and outlet ports for the medium, and artificial draft means operable to force into the chamber the air required for combustion and to forcibly move the combustion products through the conduit and through the inclosure the contents of which are heated by radiation from the conduit.

6. A heating apparatus comprising a combustion chamber so restricted in its openings as to be inoperative under a natural draft, means for automatically supplying to the combustion chamber a mixture of fuel and air, the proportion of air in the mixture being substantially that needed for the combustion of the fuel, an exhaust conduit communicating with said combustion chamber, an inclosure for the conduit and a medium to be heated and provided with suitable inlet and outlet ports for the medium, and artificial draft means for making the combustion chamber operative by sucking air into the chamber and moving the combustion products out of the chamber through the conduit in heating contiguity to the medium to be heated.

In testimony whereof I have affixed my signature in presence of two witnesses.

ALCORN RECTOR.

Witnesses:
 Dr. WATER YATES,
 CHAS. F. RANDOLPH.